United States Patent [19]

Äärilä et al.

[11] Patent Number: 5,849,844
[45] Date of Patent: Dec. 15, 1998

[54] POLYOLEFIN-CONDENSATION POLYMER BLEND

[75] Inventors: Jari Äärilä, Porvoo, Finland; Elina Koski, Porsgrunn, Norway

[73] Assignee: Borealis A/S, Lyngby, Denmark

[21] Appl. No.: 666,328

[22] PCT Filed: Dec. 16, 1994

[86] PCT No.: PCT/FI94/00570

§ 371 Date: Jul. 10, 1996

§ 102(e) Date: Jul. 10, 1996

[87] PCT Pub. No.: WO95/17466

PCT Pub. Date: Jun. 29, 1995

[30] Foreign Application Priority Data

Dec. 22, 1993 [FI] Finland ..................... 935787

[51] Int. Cl.⁶ .................. C08L 67/02; C08L 77/00; C08L 51/06
[52] U.S. Cl. ................ 525/66; 525/66; 525/71; 525/193
[58] Field of Search ................... 525/64, 66, 71, 525/193

[56] References Cited

U.S. PATENT DOCUMENTS

| 5,312,867 | 5/1994 | Mitsurna | 525/66 |
| 5,391,607 | 2/1995 | Fujii | 525/64 |

FOREIGN PATENT DOCUMENTS

| 235876 | 1/1987 | European Pat. Off. . |
| 91 05008 | 4/1991 | WIPO . |

*Primary Examiner*—Patricia A. Short
*Attorney, Agent, or Firm*—Birch, Stewart, Kolasch & Birch, LLP

[57] ABSTRACT

A process for the preparation of a plastics blend which contains a polyolefin-condensation polymer blend, in the first step of which process a crystalline polyolefin component and a low-crystallinity polyolefin component are functionalized in one process step by grafting thereto a functional monomer and by pre-dispersing the polyolefins with each other, and in the second step the functionalized polyolefin component is mixed with a condensation polymer and, when so desired, with a non-functionalized olefin polymer, and with other components of the plastics blend.

12 Claims, 1 Drawing Sheet

POLYOLEFIN-CONDENSATION POLYMER BLEND

The invention relates to a process for the preparation of a plastics blend which contains a polyolefin—condensation polymer blend, by which process a plastics blend having good thermomechanical pries is obtained and-by which process the property profile of the plastics blend can be adjusted in a controlled manner. The invention also relates to the use of a plastics blend which contains a polyolefin—condensation polymer blend, produced by this process, in applications requiring different types of processing methods, either as such or, for example as part of a multiple-layer product.

The use of plastics blends in the plastics industry is very common and varied. Plastics blends are used mainly for two different reasons, namely, the use of blends is to a high degree dependent on cost factors, i.e. polymers having the desired properties but being expensive may be mixed at suitable proportions with more economical polymers. A second factor is that by a suitable combining of different polymers the good properties of each component are obtained in the product being manufactured. Plastics blends may, of course, contain in addition to polymers also fillers such as talcum, fiber reinforcements, etc. Furthermore, plastics blends may contain numerous additives of different types, such as stabilizers, pigments, mold lubricants, foaming agents, fire retardants, etc. The most common methods of preparing plastics blends are so-called melt-mixing methods or dry-mixing methods. By melt-mixing methods the different components can be combined, for example, in an extruder within a suitable temperature range. Plastics blends can be used, for example, in injection molding, fiber, film, thermoforming, extrusion, extrusion coating, lamination, and blow molding applications.

Polyolefin—condensation polymer blends of various types are known in rather large numbers in the plastics industry. Condensation polymerization is typically used for prepaing, for example, polyesters or polyamides. Blends of polyolefins and polyesters or polyamides are also known in the patent literature.

EP patent publication 364 304 discloses a polyolefin-polyester blend which comprises 10–90% by weight a polyester in which the IV (intrinsic viscosity) is 0.30–1.20 and the quantity of carboxyl end groups is 15–200 milliequivalents/kg, and 90–10% by weight a modified polyolefin having 0.2–5 mol. % epoxy or carboxylic groups and having a low mean molar mass, i.e. 8000–14000. The blend is prepared first by dry mixing the components and then by melt mixing them in, for example, a twin screw extruder at. approx. 260° C.–320° C. The formed modified polyolefin-polyester graft copolymer is used as a compatibilizer between polycarbonates and polyolefins.

According to EP patent publication 443 736, the polyolefin-polyester blend described above and prepared in a corresponding manner is, in turn, used as a compatibilizer between polyolefins and polyesters.

EP patent publication 336 320 discloses a complicated polymer blend which is made up of a carboxylic-acid (anhydride)-modified polypropylene, a saturated polyester, a copolymer containing epoxy groups, a modified or non-modified ethylene copolymer rubber, and an alkaline, preferably amine-type, material.

Several plastics applications in which polyolefin-polyester/amide blends can be used require that the plastic has good strength properties, such as a good impact strength or elasticity modulus. However, there is usually the problem that, when one of the said properties is made sufficiently good, for example by means of a suitable mixing ratio or an elastomer addition, the other one is respectively deteriorated. Furthermore, the achieving of the desired properties has usually required higher contents of elastomeric polymer, which in turn results in a situation in which the property profile of the blend is no longer controllable. Furthermore, problems may arise in the capacity of a plastics product containing such a polymer blend to be colored and painted.

An object of the present invention has been to find, for the preparation of a plastics blend which contains a polyolefin—condensation polymer blend, a process by which it is possible to regulate the mechanical and thermomechanical properties of the blend prepared while the amounts of the basic components remains approximately unchanged.

It has also been an object of the invention to provide a plastics blend which contains a polyolefin—condensation polymer blend and has good thermal resistance properties.

It has been a further object of the invention to find, for the preparation of a plastics blend which contains a polyolefin—condensation polymer blend, a process by means of which the synergistic properties of the components can be exploited optimally, for example so that, when the impact strength of the product is increased, its elasticity modulus can be maintained at least at a sufficiently high level.

It is also an object of the invention to prepare a plastics blend which contains a polyolefin —condensation polymer blend in such a manner that a product made from such a blend can be easily painted or colored.

An object of the invention has also been to find a plastics blend preparation process by means of which a minimal water absorption, a good surface quality and a high resistance to scratching and chemicals are achieved in a product.

It has been a further object of the invention to find a preparation process for a polyolefin —condensation polymer blend as a result of which the preparation of the final plastics blend and the processibility of the product are easier. Factors having a favorable effect on processibility include a low specific energy input (S.E.I.; kWh/kg), which correlates with easy miscibility, a wide processing temperature range, good melt flowability, good melt strength, and a short cycle time (in injection molding).

It has now been observed, surprisingly, that the good properties described above can be obtained for a plastics blend which contains a polyolefin—condensation polymer blend by preparing the blend in two steps; in the first step a controlled functionalization of the polyolefins and their pre-dispersing with each other are performed, and in the second step they are mixed with a condensation polymer/condensation polymers, and, when so desired, with non-functionalized polyolefins, and with the other components of the plastics blend. The process according to the present invention is characterized in what is stated in the characterizing clause of claim 1.

The process according to the present invention can be used for preparing plastics blends in which the polyolefin—condensation polymer blend may contain 5–95% by weight one or several condensation polymers, such as a saturated polyester or polyamide, and 95 – 5% by weight olefin polymers, of which at least two contain functional groups. In addition, the plastics blend may contain inorganic fillers and fiber reinforcements, necessary additives, and possibly other polymers.

The olefin component of the polyolefin—condensation polymer blend contained in the plastics blend prepared by the process according to the invention is made up of crystalline olefin polymers and of olefin polymers of low-crystallinity. Crystalline olefin polymer is defined in this context as a polymer with a degree of crystallinity above 30%; the degree of crystallinity of a polymer of low crystallinity is respectively below 30%, in which case the polymer is elastomeric in character. Typical crystalline olefin polymers include the homopolymers of ethylene, propylene, 1-butene and 4-methyl-1 -pentene and copolymers in which the comonomer content is low, in general below 15%. Olefin polymers of a low degree of crystallinity include the copolymers of ethylene with propylene, 1-butene, vinyl acetate and alkyl acrylates, as well as ethylene-propylene(diene) elastomers.

According to the invention, the polyolefinic component of the polyolefin—condensation polymer blend to be prepared is grafted with functional groups which can form interaction relationships with the condensation polymers. These interaction relationships may be covalent in character, or they may be hydrogen or ion bonds with the condensation polymer. Such functional groups producing interaction relationships include epoxy, hydroxy, anhydride, amine, amide, isocyanate, imide, silane and carboxylic groups, either as such or partially neutralized with (alkali) metal compounds.

Good and controllable mechanical and thermomechanical properties are obtained for the polyolefin—condensation polymer blend which contains a polyolefin component of the type described above, and thus for the actual plastics blend, by preparing the blend by the process according to the present invention. The essential idea in the process according to the invention is thus that, in the first step of the two-step method, a controlled functionalization of both crystaline and low-crystallinity olefin polymers and their pre-dispersing with each other are performed, and only thereafter is this polyolefin component mixed with the other components.

The functionalization of the polyolefin component is carried out by grating it with a functional monomer in molten state. Controlled functionlization of the polyolefin component means that both the crystalline and the low-crystallinity olefin polymers are functionalized in the same process step and apparatus. If the controlled functionalizing method according to the present invention were not used, it would in general result in that only the low-crystallinity olefin polymer would become grafted, whereas the crystalline olefin would remain completely ungrafted or it would be grafted to an insufficient degree, i.e. it would not be possible to control optimally the ratio of the functional monomer grafting of the crystalline olefin polymer to that of the low-crystallinity olefin polymer.

According to a preferred embodiment, controlled functionalization of the polyolefin component is achieved by feeding the crystalline olefin polymer, the unsaturated functional monomer and the free radical initiator to the upstream end of an extruder, preferably a twin screw extruder.

The functional monomers may be carboxylic acids, carboxylic acid anhydrides or other carboxylic acid derivatives, such as esters, containing the above-mentioned functional groups. Imides as such or imidized from in-situ anhydride also belong to this group.

The free radical initiators are often peroxides, such as dialkyl peroxides, dialkyl peroxides, peroxy acids, peroxy esters, hydroperoxides, and α-oxy- and α-peroxyhydroperoxides. Other free radical initiators include azo-compounds, nitrosoanilides, and combinations of dialkylperoxides with silanes.

In addition to a functional monomer it is also possible to use other unsaturated monomers, such as aliphatic olefins, dienes, alkyl acrylates, or aromatic vinyl monomers, by means of which the conversion of the functional monomer is promoted and the degradation of polyolefins sensitive to β-degradation is reduced.

The olefin polymer of low crystallinity is preferably fed in at a point further downstream in the extruder, i.e. its feeding point in the extruder is at a distance of at least 5*D, typically 5* D–25*D from the upstream end of the extruder. D is the diameter of the extruder screw. This feeding order ensures that the free radical initiator fed in at the upstream end of the extruder has time at least in part to break down into radicals and the functionalization of the crystalline polymer has had time to start before the low-crystallinity olefin polymer is fed into the extruder. Often it may additionally be preferable to feed in also some free a at a point close to the feeding point of the low-crystallinity olefin polymer. The extruder temperature is maintained within a range of approx. 150° C.–300° C.

A polyolefin component functionalization implemented in the manner described above enables two different olefin polymers to be functionalized and an advantageous morphology to be formed in a controlled manner in one and the same process step, and thus the synergic properties of the components to be exploited maximally in the end product. It is notable that the mechanical properties, above all the essential impact strength and rigidity, can be controlled with precision by a change of the ratio between the functionalized polyolefin types (crystal/elastomeric). The preparation of the final plastics blend is also easier, since the functional olefin polymers have been pre-dispersed together already before the final melt mixing.

Furthermore, a piece made from a plastics blend which contains a polyolefin—condensation polymer blend prepared by the process according to the invention has a low water absorption, whereas, for example, polyamides normally absorb water to a detrimental degree; easy colorability and paintability are based on polarity achieved by means of functionalization. Furthermore, it has been noted that the product has a good surface quality and a high resistance to scratching and chemicals. It is additionally highly preferable that good thermomechanical properties should be obtained for the end product even with low amounts of the functional olefin polymer; for example, even small contents of elastomeric polyolefin, below 6% by weight, even 0.5% by weight, in the polymer blend improve the impact strength of the product. Normally, elastomeric polymer contents of at minimum 10% by weight, and up to 30% by weight, are recommended. The process of the invention further makes it possible to use in the preparation of the final blend, in addition to the functional polyolefin component, also non-functionalized olefin polymers, a factor which, of course, has an advantageous effect also on the price of the product.

According to the present invention, a functional olefin polymer component prepared in the manner described above and the other components of the polymer blend, i.e. the condensation polymer and possibly a non-functionalized olefin polymer, can be combined to form a polymer blend and further the final plastics blend, preferably in an extruder, more preferably a twin screw extruder. However, any melt-mixing apparatus by means of which a sufficient mixing effect is achieved is suitable for the preparation of the final plastics blend.

The processibility of a plastics blend prepared by the process according to the invention has proved to be good. For example, it can be processed within a wide temperature range, it has good melt-strength and melt-flowability properties, i.e. the molten plastics blend is an easily handled material, and a short cycle time considering, for example, injection molding applications.

The uses of a plastics blend prepared by the process according to the invention, containing a polyolefin—condensation polymer blend, include products requiring good impact strength and rigidity properties, for example, in the automobile, packaging, sports equipment, electrical engineering and electronics industries.

The following figures, examples and tables illustrate in greater detail the process for the preparation of a plastics blend which contains a polyolefin—condensation polymer blend and the properties of a product processed from the plastics blend prepared by this process, as well as their comparison with the properties of a product processed from a blend prepared by a conventional process.

BRIEF DESCRIPTION OF THE DRAWINGS

In FIG. 1, reference numeral (1) indicates the first, i.e. principal, feeding zone, in which, in the process according to the invention, the feeding in of the crystalline olefin polymer, the radical initiator, and the functional unsaturated (+other unsaturated) monomer/s takes place. Reference numeral (2) indicates the second, i.e. force-feeding, zone, in which the feeding in of the low-crystallinity olefin polymer and possibly the additional feeding in of a free-radical initiator take place. The distance between the feeding zones 1 and 2 is typically 5*D–25*D, where D is the screw diameter.

EXAMPLE 1

(Reference Example)

Figure 1:
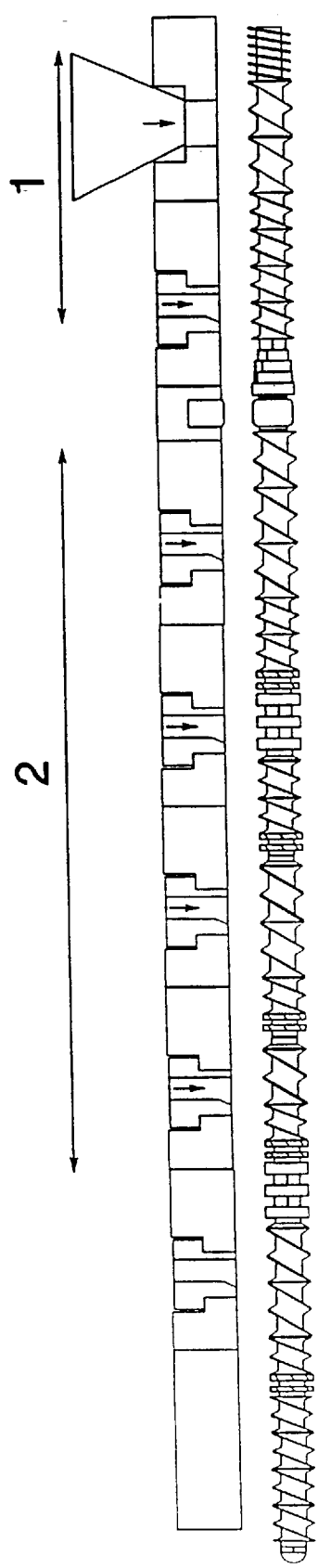
FIG. 1 depicts a preferred feeding system for the functionalization of olefin polymers (in a twin screw extruder).

Polypropylene (Neste Polypropylene VC12 12H, melt index MFR 12, manufacturer Neste Chemicals) was melt mixed with polybutene terephthalate (Crastin S600, manufacturer Ciba-Geigy) and a chemically modified polypropylene (Exxelor PO X1 1015, manufacturer Exxon Chemicals) in a Berstorff ZE25*33D twin screw extuder by using zone temperatures of 240° C. and a screw velocity of 180 $min^{-1}$. The screw configuration used had three mixing elements. The feed proportions of polypropylene, polybutene terephtha-late and modified polypropylene were 75%/20%/5%. Test bars were injection molded from the obtained polymer blend by means of a Krauss-Maffei KM 60-210B2 injection mold by using zone temperatures of 230°–250 ° C. and a mold temperature of 65 ° C. The thermomechanical properties of the test bars (Charpy notched impact strength, tensile elasticity modulus, and HDT/B (heat distortion temperature)) were measured according to ISO Standards ISO 179/1A, ISO/R 527, and ISO 75. The results are shown in Table 1.

EXAMPLE 2

(Reference Example)

By the method described in Example 1, a polymer blend was prepared in which, instead of a chemically modified polypropylene, an ethylene-butylacrylate-2,3-epoxypropyl-ter-polymer was used which had a butylacrylate content of 16% and a 2,3-epoxy-propylmetacrylate content of 3% (experimental product, manufacturer Neste Chemicals). The thermomechanical properties of the polymer blend obtained, Charpy notched impact strength, tensile elasticity modulus and HDT, were measured by using ISO Standards ISO 179/1A, ISO/R 527 and ISO 75. The results are shown in Table 1.

EXAMPLE 3

By the method described in Example 1, a polymer blend was prepared in which, instead of a chemically modified polypropylene, an olefin polymer component functionalized according to the present invention was used. This olefin polymer component was prepared in a Berstorff ZE 25*33D twin screw extruder by feeding a crystalline homopolypropylene powder (melt index 3.2, manufacturer Neste Chemicals), 2,3 -epoxypropylmetacrylate, and 1,3-bis (tertbutylperoxy-isopropyl)benzene (perkadox 14S, Akzo Chimie) into the first feeding zone (1). A low-crystallinity ethylene-butylacrylate copolymer having a butylacrylate content of 17% (Neste Polyethylene NCPE 6417, manufacturer Neste Chemicals) was fed into the second feeding zone (2), 15*D further downstream in the extruder. The feeding conditions in the preparation of the functional olefin components were:

polypropylene 67.9%,
ethylene-butylacrylate copolymer 29%,
2,3-epoxypropylmetacrylate 3%, and 1,3-bis (tertbutylperoxy-isopropyl)benzene0.1%.

The extruder temperature profile used was 160°–180°–190°– . . . –190° C., and the rotation speed was 180 $min^1$. The final polymer blend was prepared and injection molded into test bars in the manner described in Example 1. The results of the measurements of the thermomechanical properties in Table 1 demonstrate the excellent thermomechanical properties of the polymer blend prepared by the process according to the invention as compared with the polymer blends according to the reference examples.

EXAMPLE 4

Popypropylene and ethylene-propylene-elastomer were functionalized by means of maleic acid anhydride by the process of the invention by using a Berstorff ZE25*39.5D twin screw extruder. The screw velocity used was 240 $min^{-1}$ and the temperature profile was 160°–180°–190°– . . . 190° C. The screw configuration used had two mixing zones: one before the force-feeding point (2) and the other after the force-feeding point. The force-feeding point was located at a distance of 12*D from the principal feeding point (1). The ethylene propylene-elastomer (EPR) (Keltan 740P, manufacturer DSM) was fed in at the force-feeding point. The other components were fed in at the. principal feeding point. The polypropylene used was a PP-H powder, MFR 3.2, prepared by Neste Chemicals, the maleic acid anhydride (MAH) was prepared by Chimie Linz, and the peroxide, Perkadox P14S, was prepared by Akzo Chimie. Two functionalized polyolefin blends were prepared, which had different EPR contents:

4a: PP 89.45%+EPR 10% +MAH 0.5%+P14S 0.05%
4b: PP 59.45%+EPR 40%+MAH 0.5%+P14S 0.05%

The functionalized polyolefins 4a and 4b were further melt mixed with a non-functionalized polypropylene (VC12 33B, MFR 12, manufacturer Neste Chemicals) and a polyamide-6 (PA6, Snia ASN/27/33/AV, manufacturer Snia Tecnopolymeri) in the above-mentioned twin screw extruder by using a screw velocity of 200 $min^{-1}$ and set temperatures of 240° C., at the following mixing ratios:

4a1: 4a 5%+PP65%+PA6 30%
4a2: 4a 15%+PP 55%+PA6 30%
4b1: 4b 5%+PP 65%+PA6 30%
4b2: 4b 15%+PP 55%+PA6 30%

The thermomechanical properties of these blends, measured as in the previous examples, are shown in Table 2.

The results show that the increasing of the elastomer proportion (compare blend 4a1 with 4b1, and blend 4a2 with 4b2) and the increasing of the functional component (compare blend 4a1 with 4a2 and blend 4b1 with 4b2) improves the impact strength of the product significantly, while the tensile elasticity modulus decreases only slightly. It can also be seen that, when the process according to the present invention is used for preparing a polyolefin—condensation polymer blend, the impact strength can be improved considerably even with low elastomer contents. The elastomer contents of the blends 4a1 . . . 4b2 are only 0.5–6% by weight, whereas generally an elastomer addition of 10–30% is generally recommended for impact modification of polypropylene and polyamide (cf. also the following Example 5).

EXAMPLE 5

(Reference Example)

Under conditions similar to those of blends 4a1 . . . 4b2 of Example 4, a blend was compounded which contained:
3% chemically modified polypropylene (Exxelor PO X1 1015), 30% ethylene-propylene-elastomer (Keltan 740P),
37% non-functionalized polypropylene (VC12 33B), and 30% polyamide (Snia ASN/27/33AV).

The Charpy notched impact strength, tensile elasticity modulus and HDT/B were measured from the products in a corresponding manner. The results are shown in Table 2.

TABLE 1

Thermomechanical properties of polymer blends

|  | Reference example 1 | Reference example 2 | Example 3 |
|---|---|---|---|
| Charpy notched impact stregth (kJ/m$^2$) | 1,0 | 2,2 | 3,3 |
| Tensile elasticity modulus (GPa) | 1,6 | 1,4 | 1,6 |
| HDT/B (°C.) | 96 | 91 | 107 |

TABLE 2

Thermomechanical properties of polymer blends

|  | 4a1 | 4a2 | 4b1 | 4b2 | 5 |
|---|---|---|---|---|---|
| Charpy notched impact strength (kJ/m$^2$) | 3,1 | 5,3 | 3,8 | 8,5 | 5,5 |
| Tensile elasticity modulus (GPa) | 2,1 | 2,0 | 2,0 | 1,9 | 1,2 |
| HDT/B (°C.) | 122 | 118 | 123 | 113 | 106 |

We claim:

1. A process for the preparation of a polyolefin-condensation polymer blend, the polyolefin component of the blend being made up of both a crystalline polyolefin and a low-crystallinity polyolefin, wherein the polyolefin-condensation polymer blend is prepared in two steps, of which the first step comprises
   performing a functionalization of the polyolefin component, wherein said functionalization comprises
   (a) grafting the crystalline polyolefin with a functional monomer in a molten state; and
   (b) crafting the low-crystalline polyolefin with the functional monomer in a molten state, wherein the step of grafting the low-crystalline polyolefin is performed after the commencement of the step of grafting the crystalline polyolefin, and wherein the functional monomer contains at least one carbon-carbon double bond and a functional epoxy, hydroxy, anhydride, amine, amide, isocyanate, imide, silane or carboxylic group or corresponding metal complex,
   thereby forming a pre-dispersion of functionalized polyolefins; and the second step comprises
   mixing the functionalized polyolefin component with the condensation polymer component of the polymer blend or with the condensation polymer component and a non-functionalized olefin polymer.

2. A process according to claim 1, wherein the functionalization of the polyolefin component is carried out in an extruder, in a process comprising
   feeding the crystalline olefin polymer, an unsaturated functional monomer, when so desired other unsaturated monomers, and a free-radical initiator into the upstream end of the extruder; and
   feeding the low-crystallinity olefin polymer at a point further downstream in the extruder at a distance of at minimum 5*D, where D is the extruder screw diameter, from the upstream end of the extruder, wherein the temperature is within the range of 150° C.–300° C.

3. A process according to claim 2, wherein the extruder is a twin screw extruder.

4. A process according to claim 2, wherein the low-crystallinity olefin polymer is added at a distance of 5*D –25*D from the upstream end of the extruder.

5. A process according to claim 1, wherein the second step of the process is carried out in any melt-mixing apparatus having a sufficient mixing efficiency.

6. A process according to claim 5, wherein the melt-mixing apparatus is an extruder.

7. A process according to claim 6, wherein the extruder is a twin screw extruder.

8. A process according to claim 1, wherein the polyolefin-condensation polymer blend contains 5–95% by weight of one or more condensation polymers and 95–5% by weight an olefin polymer, at least two of them containing functional groups.

9. A process according to claim 1, wherein the condensation polymer is a polyester or a polyamide.

10. A process according to claim 1, wherein the polyolefin-condensation polymer blend further comprises fillers, reinforcements, necessary additives, and other polymers.

11. A process according to any of the above claims, wherein the thermomechanical proportions of the polyolefin-condensation polymer blend is adjusted by a changing of the proportions of the crystalline and the low-crystallinity polyolefins in the polyolefin component.

12. A process according to claim 1, wherein the monomer used in the functionalization of the polyolefin component contains a functional anhydride group and the condensation polymer is a polyamide.

* * * * *